(12) United States Patent
Payne

(10) Patent No.: US 7,681,057 B2
(45) Date of Patent: Mar. 16, 2010

(54) POWER MANAGEMENT OF NON-VOLATILE MEMORY SYSTEMS

(75) Inventor: Robert Edwin Payne, Edinburgh (GB)

(73) Assignee: Lexar Media, Inc., Fremont, CA (US)

( * ) Notice: Subject to any disclaimer, the term of this patent is extended or adjusted under 35 U.S.C. 154(b) by 139 days.

(21) Appl. No.: 11/835,039

(22) Filed: Aug. 7, 2007

(65) Prior Publication Data

US 2008/0215903 A1    Sep. 4, 2008

Related U.S. Application Data

(63) Continuation of application No. 10/256,804, filed on Sep. 27, 2002, now Pat. No. 7,254,724.

(30) Foreign Application Priority Data

Sep. 28, 2001   (GB) ................................ 0123421.0

(51) Int. Cl.
   *G06F 1/00*   (2006.01)
   *G06F 1/26*   (2006.01)
(52) U.S. Cl. ........................ 713/322; 713/300; 713/320; 326/93; 331/60
(58) Field of Classification Search ................ 713/300, 713/320, 322; 326/93; 331/60
   See application file for complete search history.

(56) References Cited

U.S. PATENT DOCUMENTS

| | | | |
|---|---|---|---|
| 4,099,069 A | 7/1978 | Cricchi et al. |
| 4,130,900 A | 12/1978 | Watanabe |
| 4,210,959 A | 7/1980 | Wozniak |
| 4,309,627 A | 1/1982 | Tabata |
| 4,355,376 A | 10/1982 | Gould |
| 4,398,248 A | 8/1983 | Hsia et al. |
| 4,405,952 A | 9/1983 | Slakmon |
| 4,414,627 A | 11/1983 | Nakamura |
| 4,450,559 A | 5/1984 | Bond et al. |
| 4,456,971 A | 6/1984 | Fukuda et al. |
| 4,468,730 A | 8/1984 | Dodd et al. |
| 4,473,878 A | 9/1984 | Zolnowsky et al. |
| 4,476,526 A | 10/1984 | Dodd |
| 4,498,146 A | 2/1985 | Martinez |
| 4,525,839 A | 6/1985 | Nozawa et al. |
| 4,532,590 A | 7/1985 | Wallach et al. |
| 4,609,833 A | 9/1986 | Guterman |
| 4,616,311 A | 10/1986 | Sato |
| 4,654,847 A | 3/1987 | Dutton |
| 4,710,871 A | 12/1987 | Belknap et al. |
| 4,746,998 A | 5/1988 | Robinson et al. |

(Continued)

FOREIGN PATENT DOCUMENTS

AU         0 557 723         1/1987

(Continued)

OTHER PUBLICATIONS

Mendel Rosenblum and John K. Ousterhout, The Design and Implementation of a Log-Structured File System, article, 1991, 15 pgs., Berkeley, USA.

(Continued)

*Primary Examiner*—Thomas Lee
*Assistant Examiner*—Vincent T Tran
(74) *Attorney, Agent, or Firm*—Leffert Jay & Polglaze, P.A.

(57) ABSTRACT

Methods and apparatus for placing a non-volatile memory systems in one of a number of power-down modes in response to events being monitored are useful in reducing power consumption of the non-volatile memory system. The power-down modes provide for successively less functionality, thus providing for successively less power consumption. A non-volatile memory system thus can respond to the events to place the system in a mode that permits the desired operation or a desired response time for subsequent operations while seeking to minimize power consumption.

29 Claims, 3 Drawing Sheets

U.S. PATENT DOCUMENTS

| | | | |
|---|---|---|---|
| 4,748,320 A | 5/1988 | Yorimoto et al. | |
| 4,757,474 A | 7/1988 | Fukushi et al. | |
| 4,774,700 A | 9/1988 | Satoh et al. | |
| 4,780,855 A | 10/1988 | Iida et al. | |
| 4,788,665 A | 11/1988 | Fukuda et al. | |
| 4,797,543 A | 1/1989 | Watanabe | |
| 4,800,520 A | 1/1989 | Iijima | |
| 4,829,169 A | 5/1989 | Watanabe | |
| 4,843,224 A | 6/1989 | Ohta et al. | |
| 4,896,262 A | 1/1990 | Wayama et al. | |
| 4,914,529 A | 4/1990 | Bonke | |
| 4,920,518 A | 4/1990 | Nakamura et al. | |
| 4,924,331 A | 5/1990 | Robinson et al. | |
| 4,943,745 A | 7/1990 | Watanabe et al. | |
| 4,953,122 A | 8/1990 | Williams | |
| 4,970,642 A | 11/1990 | Yamamura | |
| 4,970,727 A | 11/1990 | Miyawaki et al. | |
| 5,070,474 A | 12/1991 | Tuma et al. | |
| 5,093,785 A | 3/1992 | Iijima | |
| 5,168,465 A | 12/1992 | Harari | |
| 5,198,380 A | 3/1993 | Harari | |
| 5,200,959 A | 4/1993 | Gross et al. | |
| 5,218,695 A | 6/1993 | Noveck et al. | |
| 5,220,518 A | 6/1993 | Haq | |
| 5,226,168 A | 7/1993 | Kobayashi et al. | |
| 5,227,714 A | 7/1993 | Lou | |
| 5,253,351 A | 10/1993 | Yamamoto et al. | |
| 5,267,218 A | 11/1993 | Elbert | |
| 5,268,318 A | 12/1993 | Harari | |
| 5,268,870 A | 12/1993 | Harari | |
| 5,270,979 A | 12/1993 | Harari et al. | |
| 5,293,560 A | 3/1994 | Harari | |
| 5,297,148 A | 3/1994 | Harari et al. | |
| 5,303,198 A | 4/1994 | Adachi et al. | |
| 5,305,276 A | 4/1994 | Uenoyama | |
| 5,305,278 A | 4/1994 | Inoue | |
| 5,315,541 A | 5/1994 | Harari et al. | |
| 5,315,558 A | 5/1994 | Hag | |
| 5,329,491 A | 7/1994 | Brown et al. | |
| 5,337,275 A | 8/1994 | Garner | |
| 5,341,330 A | 8/1994 | Wells et al. | |
| 5,341,339 A | 8/1994 | Wells | |
| 5,341,341 A | 8/1994 | Fukuzo | |
| 5,353,256 A | 10/1994 | Fandrich et al. | |
| 5,357,475 A | 10/1994 | Hasbun et al. | |
| 5,359,569 A | 10/1994 | Fujita et al. | |
| 5,365,127 A | 11/1994 | Manley | |
| 5,369,615 A | 11/1994 | Harari et al. | |
| 5,371,702 A | 12/1994 | Nakai et al. | |
| 5,381,539 A | 1/1995 | Yanai et al. | |
| 5,382,839 A | 1/1995 | Shinohara | |
| 5,384,743 A | 1/1995 | Rouy | |
| 5,388,083 A | 2/1995 | Assar et al. | |
| 5,396,468 A | 3/1995 | Harari et al. | |
| 5,404,485 A | 4/1995 | Ban | |
| 5,404,543 A * | 4/1995 | Faucher et al. | 713/323 |
| 5,406,527 A | 4/1995 | Honma | |
| 5,418,752 A | 5/1995 | Harari et al. | |
| 5,422,842 A | 6/1995 | Cernea et al. | |
| 5,422,856 A | 6/1995 | Sasaki et al. | |
| 5,428,621 A | 6/1995 | Mehrotra et al. | |
| 5,430,682 A | 7/1995 | Ishikawa et al. | |
| 5,430,859 A | 7/1995 | Norman et al. | |
| 5,431,330 A | 7/1995 | Wieres | |
| 5,434,825 A | 7/1995 | Harari | |
| 5,438,573 A | 8/1995 | Mangan et al. | |
| 5,465,235 A | 11/1995 | Miyamoto | |
| 5,465,338 A | 11/1995 | Clay | |
| 5,471,478 A | 11/1995 | Mangan et al. | |
| 5,473,765 A | 12/1995 | Gibbons et al. | |
| 5,479,638 A | 12/1995 | Assar et al. | |
| 5,485,595 A | 1/1996 | Assar et al. | |
| 5,490,117 A | 2/1996 | Oda et al. | |
| 5,493,684 A * | 2/1996 | Gephardt et al. | 713/322 |
| 5,495,442 A | 2/1996 | Cernea et al. | |
| 5,504,760 A | 4/1996 | Harari et al. | |
| 5,508,971 A | 4/1996 | Cernea et al. | |
| 5,513,138 A | 4/1996 | Manabe et al. | |
| 5,515,333 A | 5/1996 | Fujita et al. | |
| 5,519,847 A | 5/1996 | Fandrich et al. | |
| 5,523,980 A | 6/1996 | Sakui et al. | |
| 5,524,230 A | 6/1996 | Sakaue et al. | |
| 5,530,673 A | 6/1996 | Tobita et al. | |
| 5,530,828 A | 6/1996 | Kaki et al. | |
| 5,530,938 A | 6/1996 | Akasaka et al. | |
| 5,532,962 A | 7/1996 | Auclair et al. | |
| 5,532,964 A | 7/1996 | Cernea et al. | |
| 5,534,456 A | 7/1996 | Yuan et al. | |
| 5,535,328 A | 7/1996 | Harari et al. | |
| 5,541,551 A | 7/1996 | Brehner et al. | |
| 5,544,118 A | 8/1996 | Harari | |
| 5,544,356 A | 8/1996 | Robinson et al. | |
| 5,550,489 A * | 8/1996 | Raab | 326/93 |
| 5,552,698 A | 9/1996 | Tai et al. | |
| 5,554,553 A | 9/1996 | Harari | |
| 5,563,825 A | 10/1996 | Cernea et al. | |
| 5,566,314 A | 10/1996 | DeMarco et al. | |
| 5,568,439 A | 10/1996 | Harari | |
| 5,572,466 A | 11/1996 | Sukegawa | |
| 5,579,502 A | 11/1996 | Konishi et al. | |
| 5,581,723 A | 12/1996 | Hasbun et al. | |
| 5,583,812 A | 12/1996 | Harari | |
| 5,592,415 A | 1/1997 | Kato et al. | |
| 5,592,420 A | 1/1997 | Cernea et al. | |
| 5,596,526 A | 1/1997 | Assar et al. | |
| 5,596,756 A * | 1/1997 | O'Brien | 713/340 |
| 5,598,370 A | 1/1997 | Niijima et al. | |
| 5,602,987 A | 2/1997 | Harari et al. | |
| 5,603,001 A | 2/1997 | Sukegawa et al. | |
| 5,606,660 A | 2/1997 | Estakhri et al. | |
| 5,606,704 A | 2/1997 | Pierce et al. | |
| 5,611,067 A | 3/1997 | Okamoto et al. | |
| 5,640,528 A | 6/1997 | Harney et al. | |
| 5,642,312 A | 6/1997 | Harari | |
| 5,648,929 A | 7/1997 | Miyamoto | |
| 5,663,901 A | 9/1997 | Wallace et al. | |
| 5,693,570 A | 12/1997 | Cernea et al. | |
| 5,712,819 A | 1/1998 | Harari | |
| 5,719,808 A | 2/1998 | Harari et al. | |
| 5,723,990 A | 3/1998 | Roohparvar | |
| 5,734,567 A | 3/1998 | Griffiths et al. | |
| 5,745,418 A | 4/1998 | Ma et al. | |
| 5,754,567 A | 5/1998 | Norman | |
| 5,757,712 A | 5/1998 | Nagel et al. | |
| 5,758,100 A | 5/1998 | Odisho | |
| 5,761,117 A | 6/1998 | Uchino et al. | |
| 5,768,190 A | 6/1998 | Tanaka et al. | |
| 5,768,195 A | 6/1998 | Nakamura et al. | |
| 5,773,901 A | 6/1998 | Kantner | |
| 5,778,418 A | 7/1998 | Auclair et al. | |
| 5,781,478 A | 7/1998 | Takeuchi et al. | |
| 5,787,445 A | 7/1998 | Daberko | |
| 5,787,484 A | 7/1998 | Norman | |
| RE35,881 E | 8/1998 | Barrett et al. | |
| 5,799,168 A | 8/1998 | Ban | |
| 5,802,551 A | 9/1998 | Komatsu et al. | |
| 5,809,515 A | 9/1998 | Kaki et al. | |
| 5,809,558 A | 9/1998 | Matthews et al. | |
| 5,809,560 A | 9/1998 | Schneider | |
| 5,818,350 A | 10/1998 | Estakhri et al. | |
| 5,818,781 A | 10/1998 | Estakhri et al. | |
| 5,822,245 A | 10/1998 | Gupta et al. | |
| 5,822,252 A | 10/1998 | Lee et al. | |
| 5,822,781 A | 10/1998 | Wells et al. | |

| | | | |
|---|---|---|---|
| 5,831,929 A | 11/1998 | Manning | |
| 5,835,935 A | 11/1998 | Estakhri et al. | |
| 5,838,614 A | 11/1998 | Estakhri et al. | |
| 5,845,313 A | 12/1998 | Estakhri et al. | |
| 5,847,552 A | 12/1998 | Brown | |
| 5,860,083 A | 1/1999 | Sukegawa | |
| 5,860,124 A | 1/1999 | Matthews et al. | |
| 5,862,099 A | 1/1999 | Gannage et al. | |
| 5,884,088 A * | 3/1999 | Kardach et al. | 713/324 |
| 5,890,192 A | 3/1999 | Lee et al. | |
| 5,901,086 A | 5/1999 | Wang et al. | |
| 5,907,856 A | 5/1999 | Estakhri et al. | |
| 5,909,586 A | 6/1999 | Anderson | |
| 5,920,884 A | 7/1999 | Jennings, III et al. | |
| 5,924,113 A | 7/1999 | Estakhri et al. | |
| 5,925,133 A * | 7/1999 | Buxton et al. | 713/323 |
| 5,928,370 A | 7/1999 | Asnaashari | |
| 5,930,815 A | 7/1999 | Estakhri et al. | |
| 5,933,368 A | 8/1999 | Ma et al. | |
| 5,933,846 A | 8/1999 | Endo | |
| 5,936,971 A | 8/1999 | Harari et al. | |
| 5,937,425 A | 8/1999 | Ban | |
| 5,953,737 A | 9/1999 | Estakhri et al. | |
| 5,956,473 A | 9/1999 | Ma et al. | |
| 5,959,926 A | 9/1999 | Jones et al. | |
| 5,966,727 A | 10/1999 | Nishino | |
| 5,986,933 A | 11/1999 | Takeuchi et al. | |
| 5,987,563 A | 11/1999 | Itoh et al. | |
| 5,987,573 A | 11/1999 | Hiraka | |
| 5,991,849 A | 11/1999 | Yamada et al. | |
| 6,011,322 A | 1/2000 | Stumfall et al. | |
| 6,011,323 A | 1/2000 | Camp | |
| 6,018,265 A | 1/2000 | Keshtbod | |
| 6,021,408 A | 2/2000 | Ledain et al. | |
| 6,026,020 A | 2/2000 | Matsubara et al. | |
| 6,026,027 A | 2/2000 | Terrell, II et al. | |
| 6,034,897 A | 3/2000 | Estakhri et al. | |
| 6,035,357 A | 3/2000 | Sakaki | |
| 6,035,410 A * | 3/2000 | Ebeshu et al. | 713/501 |
| 6,040,997 A | 3/2000 | Estakhri | |
| 6,041,001 A | 3/2000 | Estakhri | |
| 6,047,352 A | 4/2000 | Lakhani et al. | |
| 6,055,184 A | 4/2000 | Acharya et al. | |
| 6,055,188 A | 4/2000 | Takeuchi et al. | |
| 6,069,827 A | 5/2000 | Sinclair | |
| 6,072,796 A | 6/2000 | Christensen et al. | |
| 6,076,137 A | 6/2000 | Asnaashari | |
| 6,081,447 A | 6/2000 | Lofgren et al. | |
| 6,081,878 A | 6/2000 | Estakhri et al. | |
| 6,084,483 A | 7/2000 | Keshtbod | |
| 6,097,666 A | 8/2000 | Sakui et al. | |
| 6,115,785 A | 9/2000 | Estakhri et al. | |
| 6,122,195 A | 9/2000 | Estakhri et al. | |
| 6,125,424 A | 9/2000 | Komatsu et al. | |
| 6,125,435 A | 9/2000 | Estakhri et al. | |
| 6,128,695 A | 10/2000 | Estakhri et al. | |
| 6,134,145 A | 10/2000 | Wong | |
| 6,134,151 A | 10/2000 | Estakhri et al. | |
| 6,141,249 A | 10/2000 | Estakhri et al. | |
| 6,145,051 A | 11/2000 | Estakhri et al. | |
| 6,151,247 A | 11/2000 | Estakhri et al. | |
| 6,172,906 B1 | 1/2001 | Estakhri et al. | |
| 6,173,362 B1 | 1/2001 | Yoda | |
| 6,181,118 B1 | 1/2001 | Meehan et al. | |
| 6,182,162 B1 | 1/2001 | Estakhri et al. | |
| 6,202,138 B1 | 3/2001 | Estakhri et al. | |
| 6,223,308 B1 | 4/2001 | Estakhri et al. | |
| 6,226,708 B1 | 5/2001 | McGoldrick et al. | |
| 6,230,234 B1 | 5/2001 | Estakhri et al. | |
| 6,262,918 B1 | 7/2001 | Estakhri et al. | |
| 6,272,610 B1 | 8/2001 | Katayama et al. | |
| 6,275,436 B1 | 8/2001 | Tobita et al. | |
| 6,279,069 B1 | 8/2001 | Robinson et al. | |
| 6,279,114 B1 | 8/2001 | Toombs et al. | |
| 6,285,607 B1 | 9/2001 | Sinclair | |
| 6,327,639 B1 | 12/2001 | Asnaashari | |
| 6,345,367 B1 | 2/2002 | Sinclair | |
| 6,374,337 B1 | 4/2002 | Estakhri | |
| 6,377,185 B1 * | 4/2002 | Halleck et al. | 340/669 |
| 6,385,667 B1 | 5/2002 | Estakhri et al. | |
| 6,393,513 B2 | 5/2002 | Estakhri et al. | |
| 6,397,314 B1 | 5/2002 | Estakhri et al. | |
| 6,411,546 B1 | 6/2002 | Estakhri et al. | |
| 6,467,021 B1 | 10/2002 | Sinclair | |
| 6,490,649 B2 | 12/2002 | Sinclair | |
| 6,529,083 B2 * | 3/2003 | Fujita | 331/49 |
| 6,567,307 B1 | 5/2003 | Estakhri | |
| 6,578,127 B1 | 6/2003 | Sinclair | |
| 6,587,382 B1 | 7/2003 | Estakhri et al. | |
| 6,587,956 B1 * | 7/2003 | Hiratsuka et al. | 713/500 |
| 6,711,059 B2 | 3/2004 | Sinclair et al. | |
| 6,721,819 B2 | 4/2004 | Estakhri et al. | |
| 6,721,843 B1 | 4/2004 | Estakhri | |
| 6,725,321 B1 | 4/2004 | Sinclair et al. | |
| 6,728,851 B1 | 4/2004 | Estakhri et al. | |
| 6,751,155 B2 | 6/2004 | Gorobets | |
| 6,757,800 B1 | 6/2004 | Estakhri et al. | |
| 6,772,274 B1 | 8/2004 | Estakhri | |
| 6,813,678 B1 | 11/2004 | Sinclair et al. | |
| 6,898,662 B2 | 5/2005 | Gorobets | |
| 6,912,618 B2 | 6/2005 | Estakhri et al. | |
| 6,950,918 B1 | 9/2005 | Estakhri | |
| 6,957,295 B1 | 10/2005 | Estakhri | |
| 6,973,519 B1 | 12/2005 | Estakhri et al. | |
| 6,978,342 B1 | 12/2005 | Estakhri et al. | |
| 7,000,064 B2 | 2/2006 | Payne et al. | |
| 2001/0011356 A1 * | 8/2001 | Lee et al. | 713/322 |
| 2003/0033471 A1 | 2/2003 | Lin et al. | |
| 2003/0071657 A1 * | 4/2003 | Soerensen et al. | 326/93 |

FOREIGN PATENT DOCUMENTS

| | | |
|---|---|---|
| EP | 0 220 718 | 5/1987 |
| EP | 0 243 503 | 11/1987 |
| EP | 0 392 895 | 10/1990 |
| EP | 0 424 191 | 4/1991 |
| EP | 0 489 204 | 6/1992 |
| EP | 0 522 780 | 1/1993 |
| EP | 0 544 252 | 6/1993 |
| EP | 0 613 151 | 8/1994 |
| EP | 0 617 363 | 9/1994 |
| EP | 0 619 541 | 10/1994 |
| EP | 0 663 636 | 7/1995 |
| EP | 0 686 976 | 12/1995 |
| EP | 0 691 008 | 1/1996 |
| EP | 0 722 585 | 7/1996 |
| EP | 0 852 765 | 7/1998 |
| EP | 0 852 766 | 7/1998 |
| EP | 0 861 468 | 9/1998 |
| EP | 0 891 580 | 1/1999 |
| EP | 0 896 699 | 2/1999 |
| EP | 0 897 579 | 2/1999 |
| EP | 0 910 826 | 4/1999 |
| EP | 0 978 040 | 2/2000 |
| EP | 1 157 328 | 11/2001 |
| FR | 93 01908 | 8/1993 |
| GB | 1 574 058 | 9/1980 |
| GB | 2 235 787 | 3/1991 |
| GB | 2 251 323 | 7/1992 |
| GB | 2 291 990 | 2/1996 |
| GB | 2 291 991 | 2/1996 |
| GB | 2 297 637 | 8/1996 |
| GB | 2 304 428 | 3/1997 |
| GB | 2 335 293 | 9/1999 |
| GB | 2 347 531 | 9/2000 |
| GB | 2 348 991 | 10/2000 |

| | | |
|---|---|---|
| GB | 2 351 822 | 1/2001 |
| GB | 2 354 123 | 3/2001 |
| GB | 2 384 072 | 7/2003 |
| GB | 2 384 337 | 7/2003 |
| GB | 2 384 338 | 7/2003 |
| GB | 2 384 883 | 8/2003 |
| GB | 2 411 499 | 8/2005 |
| IS | 117881 | 5/2003 |
| JP | 58-215794 | 12/1983 |
| JP | 58-215795 | 12/1983 |
| JP | 59-045695 | 3/1984 |
| JP | 59-093499 | 5/1984 |
| JP | 59-162695 | 9/1984 |
| JP | 60-212900 | 10/1985 |
| JP | 61-096598 | 5/1986 |
| JP | 62-283496 | 12/1987 |
| JP | 62-283497 | 12/1987 |
| JP | 63-183700 | 7/1988 |
| JP | 1-138694 | 5/1989 |
| JP | 3-228377 | 9/1991 |
| JP | 4-057295 | 2/1992 |
| JP | 4-254994 | 9/1992 |
| JP | 4-268284 | 9/1992 |
| JP | 4-278297 | 10/1992 |
| JP | 4-332999 | 11/1992 |
| JP | 5-128877 | 5/1993 |
| JP | 5-282883 | 10/1993 |
| JP | 6-004399 | 1/1994 |
| JP | 6-036578 | 2/1994 |
| JP | 6-124175 | 5/1994 |
| JP | 6-124231 | 5/1994 |
| JP | 6-131889 | 5/1994 |
| JP | 6-132747 | 5/1994 |
| JP | 6-149395 | 5/1994 |
| JP | 6-266596 | 9/1994 |
| JP | 7-084871 | 3/1995 |
| JP | 7-093499 | 4/1995 |
| JP | 7-114499 | 5/1995 |
| JP | 7-141258 | 6/1995 |
| JP | 7-235193 | 9/1995 |
| JP | 7-311708 | 11/1995 |
| JP | 7-334996 | 12/1995 |
| JP | 8-018018 | 1/1996 |
| JP | 8-069696 | 3/1996 |
| JP | 9-147581 | 6/1997 |
| SU | 1388877 | 4/1988 |
| SU | 1408439 | 7/1988 |
| SU | 1515164 | 10/1989 |
| SU | 1541619 | 2/1990 |
| SU | 1573458 | 6/1990 |
| SU | 1686449 | 10/1991 |
| WO | WO 84/00628 | 2/1984 |
| WO | WO 94/20906 | 9/1994 |

OTHER PUBLICATIONS

Brian Dipert and Markus Levy, Designing with Flash Memory, book, Apr. 1994, 445 pgs., Aimabooks, San Diego, USA.
Science Forum, Inc., Flash Memory Symposium '95, symposium,1995, 13 pgs.; Hongo, Bunkyo-ku, Tokyo.
Ross S. Finlayson and David R. Cheriton, An Extended File Service Exploiting Write-Once Storage, article, 1987, 10 pgs. ACM.
Jason Gait, The Optical File Cabinet: A Random-Access File System for Write-Once Optical Disks, article, Jun. 1988, 12 pgs., Beaverton, Oregon.
Henry G. Baker, Memory Management, book, 1995, 19 pgs., Springer-Verlag Berlin Heidelberg, Germany.
Sape J. Mullender and Andrew S. Tanenbaum, A Distributed File Service Based on Optimistic Concurrency Control, article, 1985, 12 pgs., ACM.
Hiroshi Nakamura, Junichi Miyamoto, Kenichi Imamiya and Yoshihisa Iwata, A Novel Sense Amplifier for Flexible Voltage Operation NAND Flash Memories, symposium, 1995, VLSI Circuits Digest of Technical Papers, 2 pgs.
Hiroshi Nakamura, Junichi Miyamuro, Kenichi Imamiya, Yoshihisa Iwata, Yoshihisa Sugiura and Hideko Oodaira, A Novel Sensing Scheme with On-Chip Page Copy for Flexible Voltage NAND Flash Memories, article, Jun. 1996, 9 pgs., vol. E79-C. No. 6.
Takaaki Nozaki, Toshiaki Tanaka, Yoshiro Kijiya, Eita Kinoshita, Tatsuo Tsuchiya and Yutaka Hayashi, A 1-Mb Eeprom with Monos Memory Cell for Semiconductor Disk Application, article, 1991, 5 pgs., Journal of Solid-State Circuits, vol. 26, No. 4.
Kai Hwang and Faye A. Briggs, Computer Architecture and Parallel Processing, book, 1984, McGraw-Hill, Inc. 2 pgs., US.
Walter Lahti and Dean McCarron, State of the Art: Magnetic Vs. Optical Store Data in a Flash, article, 1990, 7 pgs., vol. 15, No. 12, McGraw-Hill. Inc., US.
Ron Wilson, Integrated Circuits; 1-Mbit flash memories seek their role in system design, article, Mar. 1, 1989, 2 pgs., No. 6, Tulsa, OK.
S. Mehroura, J.H. Yuan, R.A. Cemea, W.Y. Chien, D.C. Guteman, G. Samachisa, R.D. Noman, M. Mofidi, W. Lee, Y. Fong, A. Mihnea, E. Hann, R.W. Gregor, E.P. Eberhardt, J.R. Radosevich, K.R. Stiles, R.A. Kohler, C.W. Leung, and T.J. Mulrooney, Serial 9Mb F EEPROM for Solid State Disk Applications, symposium. 1992, 2 pgs., Mountain View, CA.
Steven H. Leibson, Nonvolatile, in-circuit-reprogrammable memories, article, Jan. 3, 1991, 12 pgs., EDN, Circle No. 12.
Ramon Caceres, Fred Douglis, Kai Li and Brian Marsh, Operating System Implications of Solid-State Mobile Computers, article, 7 pgs., Oct. 1993, Workshop on Workstation Operating Systems.
Michael Wu and Wily Zwaenepoel, A Non-Volatile, Main Memory Storage System, 12 pgs., 1994, ACM, San Jose, CA USA.
Dave Bursky, Innovative flash memories match DRAM densities: available with a choice of features, flash memories are finding homes in many systems (includes related articles on the origins of flash, and on the differences between NAND and NOR flash memories), article, May 16, 1994, 9 pgs., Electronic Design, v. 42, n. 10, The Gale Group.
Anthony Cataldo, New flash enhancements up ante. (Intel's 28F400BV—120 and 28F004BV—120, Atmel's AT29BV010 and AT29BV020, and Samsung Semiconductor's KM29V32000 flash memory devices)(Product Announcement), article, Mar. 13, 1995, 4 pgs., Electronic News, v. 41, n. 2056, The Gale Group.
Sam Weber, Flash modules' portability, reusability, small size valued for a host of APPs-Consumer formats flocking to *flash*, article. Jul. 22, 1996, 9 pgs., Electronic Engineering Times, n. 911, CMP Media.
Toshiba, MOS Memory (Non-Volatile), 1995, Data Book.
Stan Baker, But Integration Calls for Hardware, Software Changes: Flash: designers face the dawn of a new memory age, article, Sep. 12, 2003, 5 pgs., Electronic Engineering Times, 1990, N. 619, 41, CMP Media.
Toshiba, Toshiba MOS Digital Integrated Circuit Silicon Gate CMOS, (TC58NS512DC) Mar. 21, 2001, 43 pgs., Data Book.
Toshiba Corporation, SMIL (Smartmedia Interface Library) Hardware Edition Version 1.00. Jul. 1, 2000, 36 pgs., Data Book.
Toshiba, Toshiba MOS Digital Integrated Circuit Silicon Gate. (TC58512FT), Mar. 5, 2001, 43 pgs., Data Book.
Toshiba, Toshiba MOS Digital Integrated Circuit Silicon Gate. (TC58DVM92A1FT00). Jan. 10, 2003, 44 pgs., Data Book.
35Nonvolatile Memory Technology Review, A Time of Change, Proceedings 1993 Conference, Jun. 22-24, 1993, Linthlcum Heights, MD USA.
Toshiba Corporation, SMIL (Smartmedia Interface Library) Software Edition Version 1.00, Jul. 1, 2000, 136 pgs., Data Book.
Toshiba. MOS Memory (Non-Volatile), 1996, 279 pgs., Data Book.
Dan Auclair, Optimal Solid State Disk Architecture For Portable Computers, symposium, Jul. 9, 1991, 7 pgs., SunDisk Corporation.
1992 Symposium of VLSI Circuits Digest of Technical Papers, "EEPROM for Solid State Disk Applications", S. Mehoura et al., SunDisk Corporation, Sank Clara, CA. R.W. Grepor et al., AT&T Bell Laboratories, Allentown, PA. pp. 24 and 25.

* cited by examiner

POWER MANAGEMENT OF NON-VOLATILE MEMORY SYSTEMS

RELATED APPLICATIONS

This application is a continuation of U.S. patent application Ser. No. 10/256,804, filed on Sep. 27, 2002 now U.S. Pat. No. 7,254,724, entitled "Power Management System", which is commonly assigned and the contents of which are incorporated by reference herein in their entirety. U.S. patent application Ser. No. 10/256,804 further claimed the benefit of the priority date of British Application No. 0123421.0, entitled "Power Management System", filed on Sep. 28, 2001.

FIELD OF THE INVENTION

This invention relates generally to a power management system for managing power used and energy consumed in a computer system, particularly a portable computer system where there is often a limit to the peak power that can be supplied and where the energy is usually provided by batteries which have a shorter life if required to deliver increased energy and particularly to a flash disc device which is a memory system having a controller which presents the logical characteristics of a disc storage device to a host, but, which uses a non-volatile semiconductor memory device as its physical storage medium.

BACKGROUND

Minimizing peak power (where power is energy per unit time) and minimizing energy consumption are sometimes conflicting aims. To minimize the peak power drawn by a Flash Storage System may require that the Flash Storage System takes longer to perform its operations, which can lead to higher energy dissipation since the system is active over a longer period, though at a lower power over this period.

The standard Flash Controller includes a number of hardware blocks. These blocks include a Host Interface Block, a Flash Interface Block and a Microprocessor Block, which are connected to memories via a System Bus. Each of these hardware blocks consumes energy within the Flash Controller. The Host Interface and Flash interface blocks also consume energy on external interfaces. To minimize the energy consumption of the whole computer system requires the minimization of energy consumption within the Flash Controller itself, within the Flash memory, and on the Flash and Host Interfaces.

Thus, a need arises to obviate or mitigate at least one of the aforementioned problems.

SUMMARY OF THE INVENTION

According to a first aspect of the invention there is provided a power management system for use in a computer system having a memory system incorporating a non-volatile memory and a controller which presents the logical characteristics of a disc storage device to a host, the power management system comprising means for monitoring the operational activity levels within at least some of the components of the controller and arranged, in response to the monitored levels, to vary the power consumed by selected components of the controller.

Preferably the power management system further comprises at least one power management algorithm which is implemented within firmware of the power management system.

In another of its aspects the present invention comprises a non-volatile memory system having a controller incorporating a plurality of components and which presents the logical characteristics of a disc storage device to a host, where the controller incorporates a power management system having means for monitoring the operational activity levels within at least some of the components of the controller, said means being arranged, in response to the monitored levels, to vary the power consumed by selected components of the controller.

The power management system may be embodied in a discrete system manager or in a distributed manner through components of the controller.

Preferably the power management system generates the main clock signals for the controller and determines which are active and the frequency of such active clock signals.

The foregoing and other objects, features and advantages of the present invention will be apparent from the following detailed description of the preferred embodiments which make reference to several figures of the drawing.

DETAILED DESCRIPTION OF THE EMBODIMENTS

Figure 1:
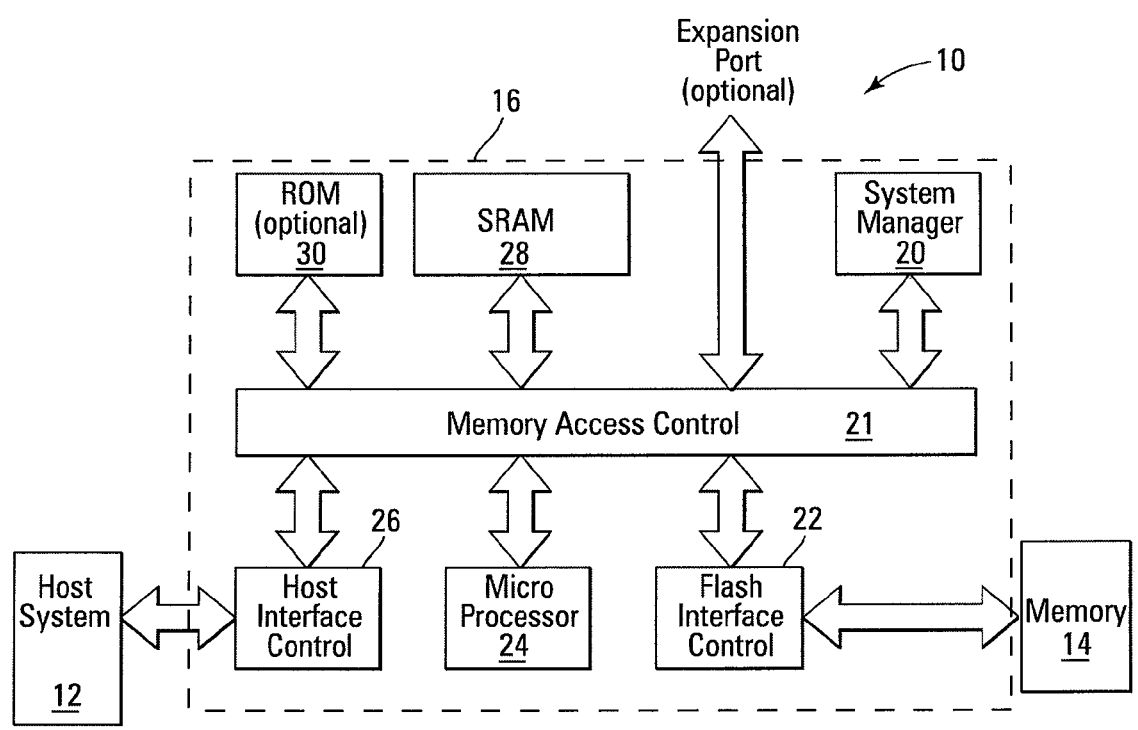
FIG. 1 illustrates a computer system incorporating a power management system in accordance with the present invention.

As is shown in FIG. 1, a computer system 10 comprises a flash memory 14, a flash controller 16 and host system 12. The controller 16 comprises a host interface block 16, a microprocessor 24, a flash interface block 22, an SRAM 28, a ROM 30, all of which are connected to a memory access control structure or system bus 21 in a manner which is well known in the art and which enables the memory system 16, 14, to present to the host system 12 the logical characteristics of a disc storage device.

Controller 16 of a system 10 additionally incorporates a power management system in the form of a system manager 20.

Having a discrete System Manager Block 20 simplifies the design and explanation of the power management features, however, the features to be described could equally be distributed and incorporated into other blocks within the hardware of controller 16. The term 'system manager' is intended to embrace both the distributed and the discrete arrangements.

The System Manager 20 is concerned with the control of reset, timing and interrupt signals within the controller 16, and the control logic for these signals may also be incorporated within the System Manager, however, this is not necessary for achieving power management.

Figure 2:
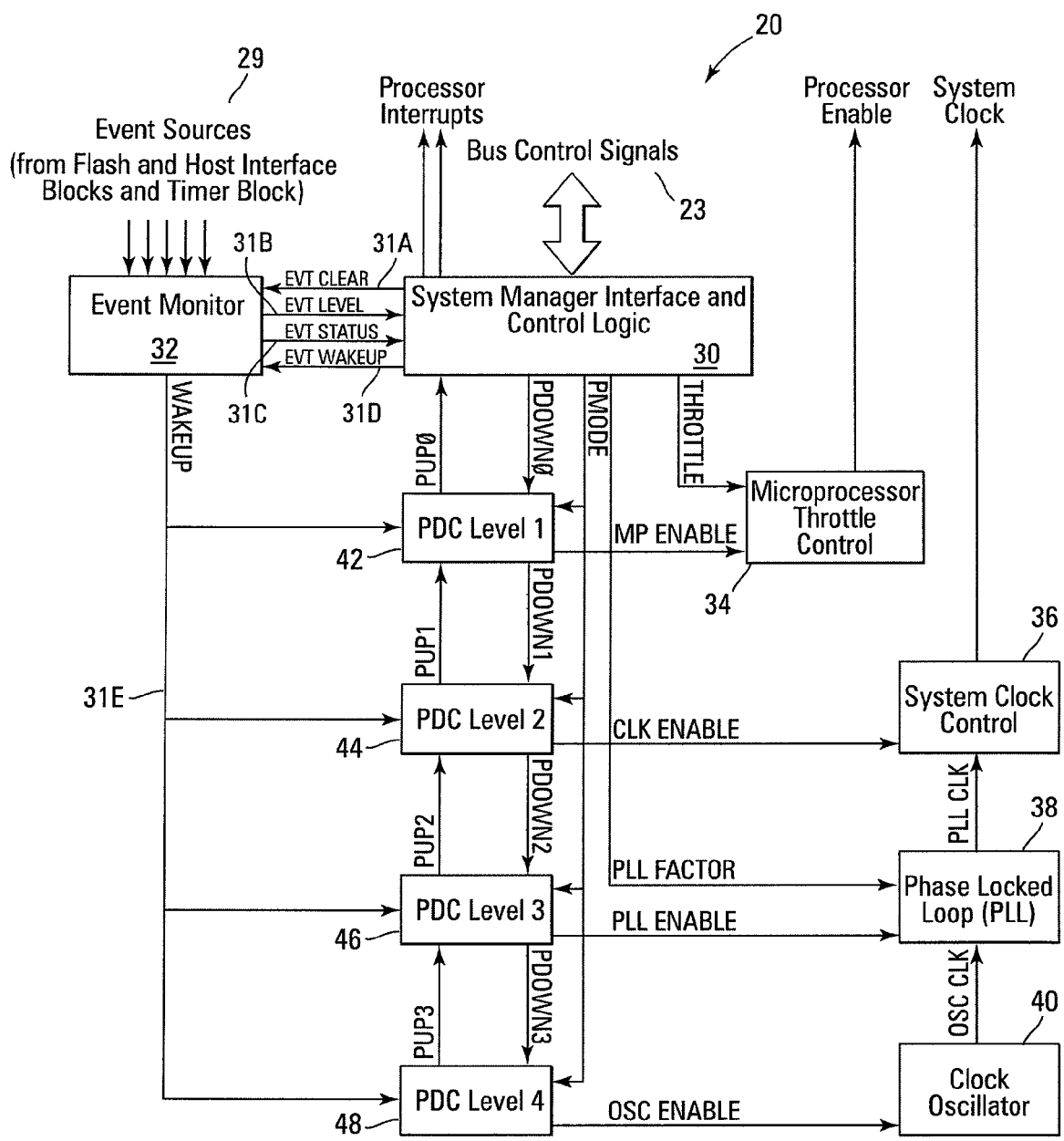
FIG. 2 illustrates the power management system of FIG. 1 in greater detail.

FIG. 2 shows the structure of the system manager 20. The system manager 20 comprises a system manager bus interface and control logic block 30 which connects the system manager 20 to the system bus 21 via bus interface 22. The system manager 20 also includes an event monitor block 32, a microprocessor throttle control block 34, system clock control block 36, a phase locked loop (PLL) block 38, clock oscillator block 40 power-down controller (PDC) level 1 block 42, PDC level 2 block 44, PDC level 3 block 46 and PDC level block 48.

The System Manager 20 generates clock signals for the rest of the controller 16. Though one clock is shown, multiple clocks for different parts of the controller 16 may be generated. Whether a clock is enabled, and its frequency, are determined by power management features. The system Manager 20 also generates other control signals to control activity within the Flash Controller 16. One signal enables the microprocessor 24. Firmware reads and writes to memory-mapped registers within the system manager 20 across the interface 30 via the system bus 21.

The Event Monitor 32 takes signals from a number of event sources 29 within the Flash Controller 16. These event sources 29 indicate when significant system events have occurred within other blocks of the controller 16 such as the Flash and Host Interface Blocks 22, 26 or the Microprocessor 24. For example, the flash and host interface blocks 22, 26 typically indicate when certain operations have completed via these signals. Events that are used to generate processor interrupts or wake-up from a power-down state are listed in Table 3. Synchronous events require the system clock to be running and so will not be generated when the controller is in power-down level 2 or higher. The processor 24 typically indicates when a special event has occurred, such as a request to enter a Debug or Test Mode. The event monitor 32 and system manger bus interface and control logic block 30 communicate via four channels which carry the signals EVT_CLEAR 31A, EVT_LEVEL 31B, EVT_STATUS 31C, and EVT_WAKEUP 31D.

The Event Monitor 32 feeds the existing level of these events to the Bus Interface and control logic block 30 on the EVT_LEVEL signal, which is composed of one bit per event. The event source signals can be de-asserted by the source at any time. In some cases, when the controller 16 is in a low-power state, it may not be able to respond to the EVT_LEVEL signal immediately, and could miss an event. Thus, the event monitor 32 provides a second copy of the events called EVT_STATUS, that cannot be de-asserted by the source of the event, but can be set (even when the rest of the system is in a low-power state). An event in EVT_STATUS can only be de-asserted by the Bus Control Logic Block 30 asserting the appropriate bit on the EVT_CLEAR signal or a System Reset.

During certain low-power modes, the Event Monitor 32 may be the only active part of the system manager 20. If required, it outputs a signal 31E to the rest of the System Manager 20 called WAKEUP, which causes the rest of the system manager 20 to exit from a low-power mode. The WAKEUP signal is asserted when an event is asserted on EVT_STATUS and the corresponding event bit is asserted on EVT_WAKEUP. Thus, the GBus Interface block 30 can control which events cause the manger 20 to wake-up. Firmware via the Bus Interface 30 block reads the values of both EVT_LEVEL and EVT_STATUS and asserts EVT_CLEAR and EVT_WAKEUP.

Included within the System Manager 20 are blocks 36, 38, 40 for generating the main clock signals for the controller 16 and for enabling other blocks within the controller 16 such as the Microprocessor 24.

The clock generation chain consists of clock oscillator module 40, that generates the fundamental clock for the controller 16 (named OSC_CLK). The frequency of this clock is normally determined by external components such as a Quartz Crystal or a Resistor-Capacitor charging/discharging circuit. The next stage in the clock generation is the PLL (Phase Locked Loop) block 38 which takes the fundamental clock frequency OSC_CLK and multiplies it by a factor to generate the signal PLL_CLK. Finally, this goes into the system clock control block 36, which controls the distribution of the clock to the rest of the controller 16.

The System Manager 20 has four power-down modes that are used to control which clock signals are active within the controller 16. Successive Levels of Power-Down mode turn off more functionality within the controller 16 to save power. The term Power-Down Mode 0 is used to describe normal system operation when all parts of the controller 16 are active. Table 1 illustrates how functionality of the controller 16 is progressively turned off to save power with successive Power-Down Modes.

In Power-Down Mode 1 which is determined by block 42, the Microprocessor 24 is disabled in a controlled fashion, so that other blocks within the controller 16 such as the Flash and Host Interface Blocks 22, 26 can continue to access memory 14 and perform their functions. The enable signal to the processor 24 is turned off using the MP_ENABLE signal from block 42 that feeds into the Processor Throttling Block 34.

In Power-Down Mode 2 which is determined by block 44, the System Clock 36 is disabled using the CLK_ENABLE signal from block 44. Functions within the controller 16 that rely on the system clock being enabled are disabled and their power dissipation reduced or eliminated. A result of this is that the main system bus 21 will be disabled so that communication between blocks within the controller 16 across the bus 21 will be disabled.

In Power-Down Mode 3 which is determined by block 46, the PLL 38 is disabled using the PLL_ENABLE signal from block 46. PLL 38 may take a certain time to synchronize with the OSC_CLK signal from oscillator 40, so a synchronization delay is usually required when the controller is powering up from Power-Down Mode 3 to Power-Down Mode 2.

In Power-Down mode 4 which is determined by block 48, the clock oscillator 40 is disabled using the OSC_ENABLE signal from block 48. The clock oscillator 40 may take a certain time to start oscillating again depending on the nature of the external components used to determine the clock frequency, so a delay is required when the controller is powering up from Power-Down Mode 4 to Power-Down Mode 3.

As regards sequencing of power-down and power-up each PDC 42, 44, 46, 48 receives a request for entry to a power-down mode on a PDOWN signal or entry to a power-up mode on the PUP signal. For example, the first PDC 42 will power-down the part of the controller 16 that it controls and then if this is not the target Power-Down Mode (as indicated on the PMODE signal issued by block 30), it will assert its PDOWN signal to the next PDC 44 so that it should power-down and so on.

When the Event Monitor 32 asserts the WAKEUP signal 31E, the PDC's sequentially from the PDC of the target Power-Down Mode will wake-up the part of the controller 16 that it is responsible for. If a delay is required before this part of the controller 16 is ready then the PDC's ensure that this delay is met. The length of the delay may be configured Firmware writing to registers within the Bus Interface and Control Logic 30. The value of these registers is passed onto the appropriate PDC, which alters the Power-Up delay to reflect the register value. These signals indicating the length of the delay are not illustrated. Finally the PDC asserts its Power-Up output PUP which causes the next PDC in the chain to wake-up in a similar fashion.

Initially entry to a power-down mode is made by firmware writing to a register within the System Manager Bus Interface and Control Logic block 30, which indicates the desired Power-Down Mode. This causes the PMODE signal to indicate the target power-down level, and the PDOWN0 signal to be asserted which initiates the entry into the Power-Down Mode.

The modular structure of one PDC 42, 44, 46, 48 for each section of the clock generation and processor control 34, 36, 38, 40 allows the structure to be easily adapted for different clock generation structures. In addition, this structure is robust in that it guarantees that the controller 16 is powered-down and powered-up in an orderly manner, so that, for example, the processor 24 is not powered-up before the system clock signal is enabled.

A second power-management feature of the manager 20 is the ability to change the clock frequency by changing the multiplication factor that relates the PLL 38 input frequency to its output frequency. Lowering the Clock frequency lowers the power dissipation within the controller 16, but, also can reduce the data transfer performance of the controller 16.

To vary the PLL multiplication factor firmware writes to a register within the Bus Interface and Control Logic block 30 which sets the value of PLL_FACTOR that indicates the PLL Multiplication Factor. In some cases, Firmware may want the value of PLL_FACTOR to be reset to a certain value when a system event occurs. For example, the Firmware sets a low clock frequency to reduce power, but it then wants to process an interrupt quickly, the firmware may not want to continue to run at the low clock frequency. However, it takes a certain amount of time to write to the register that determines PLL_FACTOR. To overcome this problem, the firmware can set a flag within the Bus Interface and Control Logic block 30 which will cause the block 30 to reset the PLL_FACTOR when certain events occur as indicated by the Event Monitor 32.

The Microprocessor 24 is often the main source of power dissipation in the Controller 16 as it consumes power itself and also is the main source of memory access requests within the Controller 16. To allow the power consumption of the Microprocessor 24 to be controlled the System Manager 20 includes a Microprocessor Throttle Block 34.

The Throttle Block 34 controls how often the Microprocessor 24 is enabled. The fewer clock cycles that the Microprocessor 24 is enabled for, the lower the power it consumes. The mechanism used to achieve disablement of the Microprocessor 24 can vary. For example, the output of throttle block 34 can be used directly to disable the Microprocessor 24 or to switch off the clock signal within controller 16 to the Microprocessor 24. Alternatively, the output of the throttle block 34 can be used to deny access of the Microprocessor 24 to the Main-System Bus 21, thus preventing it from fetching instructions and causing it to halt.

The Throttle Block 34 takes two inputs: one is MP_ENABLE from the PDC 42 for the Power-Down Mode 1. The MP_ENABLE signal is used to completely disable the Microprocessor 24 when Power-Down Mode 1 is entered. The other input to the Throttle Block 34 is THROTTLE which consists of three values M, S and B which determine the proportion of time that the Microprocessor 24 is enabled. The value of THROTTLE can be changed by the firmware writing to registers within the Bus Interface and Control Logic Block 30.

The values M (Mark) and S (Space) determine the ratio of clock cycles for which the Microprocessor 24 is enabled and disabled. The B value determines the minimum number of clock cycles in a row the Microprocessor 24 will be enabled or disabled for. This allows the Microprocessor 24 to gain access to the Memory 14 for a minimum number of clock cycles, since there would be overhead and inefficiencies when enabling and disabling the Microprocessor 24 for too few clocks cycles.

Thus, the values M, S and B indicate that the Microprocessor 24 is enabled for M*B clock cycles from every (M+S)*B clock cycles. The hardware interleaves M blocks of cycles with S blocks of cycles in an optimum way to minimize long sequences of cycles with the Microprocessor 24 disabled, which could reduce the Microprocessor 24 responsiveness to events such as interrupts.

The pattern set by M, S, and B is as follows. The pattern starts with a block of B clock cycles with the Microprocessor 24 being enabled and then B clock cycles with the Microprocessor 24 being disabled. The alternation of blocks of the Microprocessor 24 being enabled and disabled repeats up to the minimum value from M and S. If M=S then the pattern now repeats, otherwise, if M>S, then the Microprocessor 24 is enabled for M−S blocks of B clock cycles and then the pattern repeats, but, if M<S then the Microprocessor 24 is disabled for S−M blocks of B clock cycles and then the pattern repeats.

The hardware always ensures that the first block within a pattern of enabling and disabling the Microprocessor 24 has the Microprocessor 24 enabled regardless of the value of M, thus setting M=0 is equivalent to M=1 in order to prevent the Microprocessor 24 being never enabled. The hardware also interprets the value of B=0 as the maximum block size allowed by the hardware.

Some examples of the patterns possible of the hardware enabling and disabling the Microprocessor 24 for different values of M, S and B are shown in Table 2.

Other schemes for defining the ratio of cycles for which the microprocessor 24 is enabled and disabled are possible.

As with the PLL Multiplication Factor feature discussed previously, it is useful to allow Firmware to allow the Microprocessor Throttle 34 to reset the time for which the Microprocessor 24 is enabled to its maximum value when certain system events occurs, to allow for fast reaction to controller events. Firmware can write to a register within the Bus Interface and Control Logic block 30 to enable this feature.

It will be appreciated that the Flash Interface Block 22 is non standard in that it incorporates features to operate with a range of different main system clock frequencies, since the main clock frequency of the controller 16 may be changed to reduce power consumption by operation of blocks 36, 38 of the system manager 20.

If the main clock frequency of the flash controller is changed then this will affect the timing of signals generated by the Flash Interface Block 22. If the clock frequency is increased then the timing of signals on the flash interface may become too quick for the Flash memory 14. If the clock frequency is decreased then the transfer rate of data to and from the Flash memory 14 will be reduced.

If the Flash Interface 22 is a major source of power dissipation, then it may be advantageous to reduce the transfer rate on the interface to reduce peak power consumption, but this reduces the data transfer rate to and from the Flash memory 14.

Accordingly, to support these power management modes, the Flash Interface Block 22 is designed to allow the timing of signals to and from the Flash memory 14 to be changed relative to the main controller system clock. Two features in the Flash Interface Block 22 are incorporated to support this. The first feature is a frequency divider circuit that is placed on the main clock that supplies the basic timing reference for the signals on the Flash interface 22. This allows the speed of the Flash Interface to be reduced to reduce peak power consumption, without affecting the frequency of the main clock. The second feature is the timing of signals in the Flash interface 22 can be controlled on a clock cycle by clock cycle basis. When the main clock frequency is decreased; this allows the timing of signals to be made quicker by reducing the number of clock cycles for which a signal on the Flash Interface is asserted or de-asserted.

Finally, the Flash Interface Block 22 is designed so that it can use the power management features within the Flash memory 14 which requires that Flash memory select signal to be taken to a voltage close to that of the power supply rail to engage a low power mode.

It will further be understood that the host interface block 26 is different from the flash interface block 22, in the most actions on the host interface block 26 are initiated and timed by the host 12 and not by the controller 16. Many host interface protocols allow the Flash Storage System 14, 16 to indicate at system power-up what host interface timing will be used, but do not allow this timing to be changed later.

Though in most Host interface protocols, the data transfer rate to and from the Flash Storage System 14, 16 is determined by the host 12, most host interface transfer protocols allow the Flash Storage System 14, 16 to indicate when it is ready to accept the transfer of data or of a command. The Flash Controller 16 uses this feature of the host interface 26 to control the rate of data and command transfer and thus minimize peak power though this reduces system performance. To support this, the Host Interface block 26 needs to be flexible in when it asserts signals that say if it is ready to accept a command or do a data transfer. If features are incorporated to let hardware automatically set these signals, then the automatic setting of these signals should configurable, so that flags can be set under direct Firmware control if necessary for power management.

If the protocol allows for the basic timing of a data or command transfer to be slowed down by asserting signals on the interface 26 during the transfer then these should also be settable by Firmware to allow the transfer rate to be reduced.

Reference has been made to firmware that has to utilize the power management features within the flash controller hardware to minimize power consumption with minimal impact or performance. This will now be explained.

If at a point within the firmware, the firmware has to stop and wait for an event monitored by the Event Monitor 32, then the firmware enables the system manager 20 to wake-up on this event and then enter a power-down mode. The Power-Down Mode powered-down to is determined by activity in other parts of the controller 16. For example, if the Host or Flash interface 26, 22 need the clock to be running to transfer data then Power-Down Level 1 is the maximum level that can be entered. Higher power down levels can be entered if no such constraint exists, but may be limited by the time taken for the Oscillator 40 and PLL 38 to power-up.

Other events that are required to interrupt the processor 24 also trigger the system manager 20 to wake-up. If the system manager 20 is woken-up by an interrupt event, it then responds to the interrupt and then the Firmware returns to the Power-down mode selected, if the system event being waited for has not occurred.

Examples of doing this are events such as waiting for the host 12 to issue a command or transfer data, or waiting for Flash memory 14 to complete an operation.

Events within the controller 16 that are not monitored by the Event Monitor 32 cannot cause the system manager 20 to wake-up. In these cases the Microprocessor 24 has to wait, polling a register until the event occurs. In this mode, the Microprocessor 24 must be active, but, need not run at full speed.

Accordingly using the Microprocessor Throttling mechanism of block 34 can reduce power consumption in this case by reducing the frequency of polling the register. Also, when reducing the clock frequency will not affect the performance of other parts of the controller 16 then the PLL multiplication factor of block 38 can be reduced. When the event being polled for has occurred, the firmware can return the controller 16 to its normal operating frequency.

When firmware determines that it needs to limit power consumption on the Host Interface Block 26, then it can reduce the power being consumed by indicating to the Host 12 that it is busy, even when it has actually finished an operation or is ready to accept data. During this time, the controller 16 can perform other operations, or the controller 16 can enter a Power-Down Mode for a period of time to lower power consumption and trigger the system manager 20 to wake-up after a specified time by using an event triggered by a timer within the Flash Controller 16. At this point, the controller 16 can release busy and continue operation. As an alternative to asserting busy, the controller 16, if the host interface transfer protocol permits, can slow down the host transfer timing. This allows the host 12 to continue data transfer but at a reduced rate.

When the controller cycle time is changed to reduce power, Firmware may choose to adjust the timing of the Flash interface 22 to use fewer clock cycles to ensure that the transfer rate to memory 14 is maintained.

If Firmware wants to reduce power consumption specifically on the Flash interface 22 then it can lengthen the timing of commands on the Flash Interface 22, though this will reduce the transfer rate to memory 14. One example, of lengthening Flash Commands is when polling the status of the memory 14. Firmware can lengthen the timing of the polling command, and then set the Flash Interface 22 to trigger an event when the Polling command has finished. Firmware can then go to sleep for the duration of the polling command.

When Firmware enters sections of code that requires the Microprocessor 24 to be active for a long period of time, then peak power consumption can be reduced by using the Microprocessor Throttle Mechanism of block 34 and the PLL Multiplication Factor of block 38.

Figure 3:
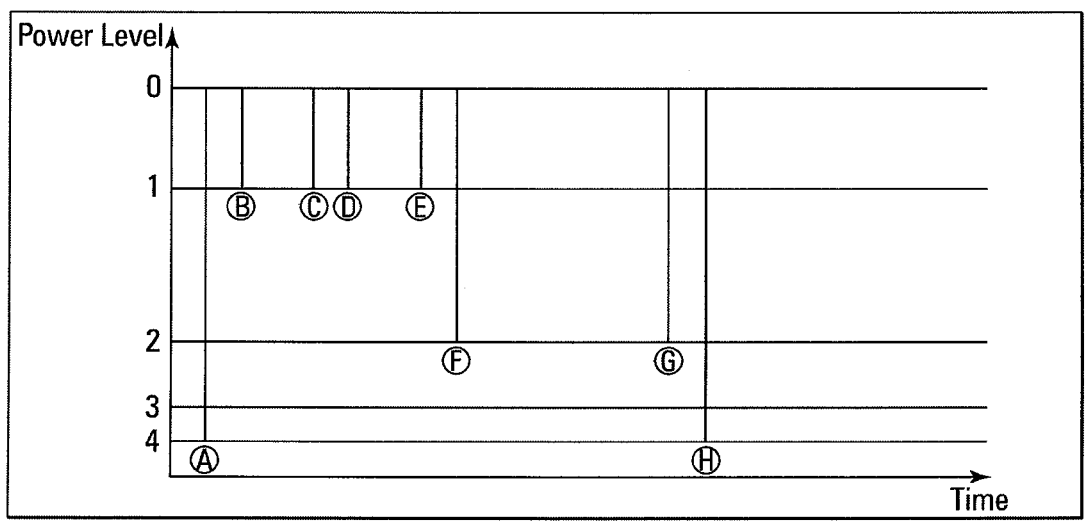
FIG. 3 illustrates an example of the way in which the controller 16 of FIG. 1 switches between different power levels during the execution of a Write Sector command from a host.

An example of the way in which the controller switches between different power levels during the execution of a Write Sector command from a host is given with reference to FIG. 3. The relative levels of the different power levels are for illustration only. In this example, the controller does not need to respond rapidly to host commands, and the startup times of clock oscillator 40 and phase locked loop 38 during wake-up from power-down levels 4 and 3 are not important. If fast response to a host command is required, it might not be possible to switch to power-down level 4 when the host interface is in the idle state.

At time A the host writes a command to the controller, which generates event 4 shown in Table 3 and causes the controller to wake-up through levels 3, 2 and 1 before the processor starts executing in level 0.

The processor clears the host command event and sets up the DMA hardware to allow the host to transfer data to the controller. Once the DMA is set up, the controller is put into power-down level 1 at time B. It is not possible to enter a higher power down level as the MDA transfer requires that the system clock is running.

When the host transfers the required data at time C, event 5 is generated and wakes up the controller to power-down level 0. The processor now sets up the Flash Interface Control to transfer the data to Flash memory and then reverts to power-down level 1 at time D. Again, a higher power-down mode cannot be used because the transfer to Flash memory requires that the system clock is running.

When the data transfer to Flash memory completes at time E, event 7 is generated. The controller again wakes up to power down level 0. The processor checks that the transfer was successful, starts the Flash programming operation and then enters power-down level 2 at time F, which halts the system clock.

At time G, the Flash programming operation completes and the Flash busy line makes a low to high transition, which generates event 6. The controller wakes up through power-down level 1 to power-down level 0. The processor checks that the programming operation was successful, sets up the response to the host and powers-down to level 4 at time H.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

TABLE 1

Power Down Modes

| | Power Down Mode | | | | |
|---|---|---|---|---|---|
| | 0 | 1 | 2 | 3 | 4 |
| Microprocessor Enabled | Y | N | N | N | N |
| System Clock Enabled | Y | Y | N | N | N |
| PLL Enabled | Y | Y | Y | N | N |
| Oscillator Enabled | Y | Y | Y | Y | N |

TABLE 2

Pattern of Microprocessor Access with Varying M, S

| M | S | B | Pattern of Enabling and Disabling Microprocessor M = microprocessor enabled S = microprocessor disabled |
|---|---|---|---|
| 1 | 1 | 1 | MS |
| 1 | 1 | 3 | MMMSSS |
| 1 | 3 | 3 | MMMSSSSSSSS |
| 4 | 2 | 1 | MSMSMM |
| 0 | 2 | 2 | MMSSSS |
| 2 | 0 | 2 | MMMM |

TABLE 3

| Event | Synchronous/ Asynchronous | Description |
|---|---|---|
| 0 | Async | Host Reset 0. Triggered when the host reset goes from logic 1 to logic 0. |
| 1 | Async | Host Reset 1. Triggered when the host reset goes from logic 0 to logic 1. |

TABLE 3-continued

| Event | Synchronous/ Asynchronous | Description |
|---|---|---|
| 2 | Async | Host Software Reset 0. Host Software reset bit change from 1 to 0 triggers this event. |
| 3 | Async | Host Software Reset 1. Host Software reset bit change from 0 to 1 triggers this event. |
| 4 | Async | Host Command. The host interface block generates this interrupt when a new host command is received. |
| 5 | Async | Host DMA Completion. The host interface block generates this interrupt when a Host DMA Transfer is complete. |
| 6 | Async | Flash Not Busy. Generated when a BUSY signal from Flash memory goes high. |
| 7 | Sync | Flash Interface Control Operation Complete. Generated when completes the current sequence of operations. |
| 8 | Sync | Timer Interrupt. Generated when the internal timer reaches zero. |
| 9 | Async | Host Activity. Generated when activity on Host Interface. |

What is claimed is:

1. A controller for a non-volatile memory system, comprising:

a system bus;

a power management system in communication with the system bus and comprising a clock oscillator adapted to selectively output a fundamental clock signal, a phase-locked loop adapted to selectively output a second clock signal in response to the fundamental clock signal, and a system clock control adapted to selectively distribute a system clock signal in response to the second clock signal;

a microprocessor in communication with the system bus;

a first interface in communication with the system bus and adapted for communication with a non-volatile memory device; and a second interface in communication with the system bus and adapted for communication with a host system;

wherein the power management system is adapted to monitor events from sources including at least the first interface and the second interface;

wherein the power management system is further adapted to select one of a plurality of successive power-down modes in response to the events;

wherein, in a first power-down mode, the controller is adapted to provide for normal operation;

wherein, in a second power-down mode, the microprocessor is disabled;

wherein, in a third power-down mode, the system clock control is further disabled;

wherein the phase-locked loop is configured to receive the fundamental clock signal from the clock oscillator and to generate the second clock signal by directly multiplying the fundamental clock signal by a multiplication factor that is received at an input of the phase-locked loop; and wherein the power management system is further adapted to alter the multiplication factor in response to one or more of the events.

2. The controller of claim 1, wherein the power management system further comprises:
 a first power-down controller for generating a first enable signal for selectively enabling or disabling the microprocessor; and
 a second power-down controller for generating a second enable signal for selectively enabling or disabling the system clock control.

3. The controller of claim 1, wherein, in a fourth power-down mode, the phase-locked loop is further disabled.

4. The controller of claim 3, wherein the power management system further comprises:
 a first power-down controller for generating a first enable signal for selectively enabling or disabling the microprocessor;
 a second power-down controller for generating a second enable signal for selectively enabling or disabling the system clock control; and a third power-down controller for generating a third enable signal for selectively enabling or disabling the phase-locked loop.

5. The controller of claim 4, wherein the third power-down controller is adapted to enforce a delay when transitioning from the fourth power-down mode to the third power-down mode.

6. The controller of claim 3, wherein, in a fifth power-down mode, the clock oscillator is further disabled.

7. The controller of claim 6, wherein the power management system further comprises:
 a first power-down controller for generating a first enable signal for selectively enabling or disabling the microprocessor;
 a second power-down controller for generating a second enable signal for selectively enabling or disabling the system clock control;
 a third power-down controller for generating a third enable signal for selectively enabling or disabling the phase-locked loop; and
 a fourth power-down controller for generating a fourth enable signal for selectively enabling or disabling the clock oscillator.

8. The controller of claim 7, wherein the fourth power-down controller is adapted to enforce a delay when transitioning from the fifth power-down mode to the fourth power-down mode.

9. The controller of claim 1, wherein the first interface is further adapted for communication with a flash memory device.

10. The controller of claim 1, wherein the second interface is further adapted to present the logical characteristics of a disc storage device to the host system.

11. The controller of claim 1, further comprising a register coupled to the phase-locked loop and configured to store the multiplication factor.

12. The controller of claim 11, wherein the power management system is further adapted to alter the multiplication factor within the register in response to the one or more of the events while the phase-locked loop is enabled.

13. The controller of claim 1, wherein the power management system is further adapted to throttle operation of the microprocessor in response to one or more of the events while in the first power-down mode.

14. The controller of claim 1, wherein the power management system is adapted to throttle operation of the microprocessor by selectively cycling the microprocessor on and off in response to a first register value indicative of a desired ratio value of enabled cycles, a second register value indicative of a desired ratio value of disabled cycles, and a third register value indicative of a minimum number of consecutive cycles that the microprocessor must remain in either an enabled condition or a disabled condition.

15. The controller of claim 1, wherein the controller is coupled between the non-volatile memory and the host system.

16. A method of operating a non-volatile memory system, comprising:
 monitoring events from at least one source;
 placing the non-volatile memory system in a first power-down mode in response to one or more first events, wherein the first power-down mode permits normal operation of the non-volatile memory system;
 placing the non-volatile memory system in a second power-down mode in response to one or more second events, wherein placing the non-volatile memory system in the second power-down mode comprises disabling a microprocessor of the non-volatile memory system;
 receiving a fundamental clock signal and a multiplication factor at a phase-locked loop of the non-volatile memory system;
 altering the multiplication factor in response to one or more of the monitored events;
 generating a system clock signal at the phase-locked loop by directly multiplying the fundamental clock signal by the multiplication factor; and
 placing the non-volatile memory system in a third power-down mode in response to one or more third events, wherein placing the non-volatile memory system in the third power-down mode comprises disabling distribution of the system clock signal of the non-volatile memory system.

17. The method of claim 16, wherein placing the non-volatile memory system in the third power-down mode in response to one or more third events further comprises placing the non-volatile memory in the second power-down mode if it is in the first power-down mode before placing the non-volatile memory in the third power-down mode.

18. The method of claim 16, further comprising placing the non-volatile memory system in a fourth power-down mode in response to one or more fourth events, wherein placing the non-volatile memory system in the fourth power-down mode comprises disabling generation of the system clock signal.

19. The method of claim 18, further comprising enforcing a delay when transitioning from the fourth power-down mode to the third power-down mode.

20. The method of claim 18, further comprising:
 if the non-volatile memory system is in the first power-down mode, placing the non-volatile memory system in the second power-down mode and then placing the non-volatile memory system in the third power-down mode before placing the non-volatile memory system in the fourth power-down mode; and
 if the non-volatile memory system is in the second power-down mode, placing the non-volatile memory system in the third power-down mode before placing the non-volatile memory system in the fourth power-down mode.

21. The method of claim 18, further comprising placing the non-volatile memory system in a fifth power-down mode in response to one or more fifth events, wherein placing the non-volatile memory system in the fifth power-down mode comprises disabling generation of a fundamental clock signal used to generate the system clock signal.

22. The method of claim 21, further comprising enforcing a delay when transitioning from the fifth power-down mode to the fourth power-down mode.

23. The method of claim 21, further comprising:
- if the non-volatile memory system is in the first power-down mode, placing the non-volatile memory system in the second power-down mode then placing the non-volatile memory system in the third power-down mode then placing the non-volatile memory system in the fourth power-down mode before placing the non-volatile memory system in the fifth power-down mode;
- if the non-volatile memory system is in the second power-down mode, placing the non-volatile memory system in the third power-down mode then placing the non-volatile memory system in the fourth power-down mode before placing the non-volatile memory system in the fifth power-down mode; and
- if the non-volatile memory system is in the third power-down mode, placing the non-volatile memory system in the fourth power-down mode before placing the non-volatile memory system in the fifth power-down mode.

24. The method of claim 21, further comprising receiving the multiplication factor at the phase-locked loop from a register of the non-volatile memory system.

25. The method of claim 24, further comprising altering the multiplication factor within the register while generating the system clock signal.

26. The method of claim 16, further comprising presenting logical characteristics of a disc storage device to a host system while in the first or second power-down modes.

27. The method of claim 16, further comprising throttling operation of the microprocessor in response to one or more of the first events while in the first power-down mode.

28. The method of claim 16, wherein throttling operation of the microprocessor comprises selectively cycling the microprocessor on and off.

29. The method of claim 16, further comprising making a copy of an event signal that cannot be de-asserted by a source of the event generating the event signal and responding to the copy of the event signal in determining whether an event has occurred.

* * * * *